United States Patent [19]

Buss et al.

[11] Patent Number: 4,482,637

[45] Date of Patent: Nov. 13, 1984

[54] IN SITU HYDROCARBON CONVERSION CATALYST REGENERATION AND SULFUR DECONTAMINATION OF VESSELS COMMUNICATING WITH CATALYST REACTOR

[75] Inventors: Waldeen C. Buss, Richmond; Thomas R. Hughes, Orinda, both of Calif.

[73] Assignee: Chevron Research Company, San Francisco, Calif.

[21] Appl. No.: 405,149

[22] Filed: Aug. 4, 1982

[51] Int. Cl.³ .................... B01J 23/96; C10G 35/095
[52] U.S. Cl. .................................. 502/37; 208/140; 502/49; 502/52; 502/517
[58] Field of Search .............. 252/411.5, 415, 416, 252/419; 208/140; 502/49, 52, 517, 37

[56] References Cited

U.S. PATENT DOCUMENTS

| | | | |
|---|---|---|---|
| 2,792,337 | 5/1957 | Engle | 208/140 |
| 2,873,176 | 2/1959 | Hengstebeck | 23/288 |
| 2,884,372 | 4/1959 | Bergstrom | 208/113 |
| 2,892,770 | 6/1959 | Coley et al. | 208/140 |
| 2,905,631 | 9/1959 | Robins, Jr. et al. | 252/419 |
| 2,923,679 | 2/1960 | Thomson | 208/140 |
| 3,137,646 | 6/1964 | Capsuto | 208/65 |
| 3,716,477 | 2/1973 | Jacobson et al. | 208/139 |
| 3,773,686 | 11/1973 | Hayes | 208/140 |
| 3,835,063 | 9/1974 | Davis, Jr. et al. | 252/415 |
| 4,033,898 | 7/1977 | Jacobson et al. | 208/140 |
| 4,155,836 | 5/1979 | Collins et al. | 208/139 |

Primary Examiner—P. E. Konopka
Attorney, Agent, or Firm—Burns, Doane, Swecker & Mathis

[57] ABSTRACT

A method is disclosed for regenerating reforming catalysts containing a platinum group component and/or rhenium component in association with a halogen component on a porous inorganic oxide, such as one containing alumina without significant displacement of the rhenium components by sulfur oxides generated during the regeneration process. The method is particularly characterized in that carbon is removed from the catalyst by in situ oxidation at temperatures not in excess of about 750° F. and without modification of the catalytic reforming process flow circuit, as by disconnecting or isolating the heat exchangers and furnace tubes.

Sulfide scale is converted in a separate oxidation step to sulfur dioxide, $SO_2$, without substantial oxidation to sulfur trioxide, $SO_3$, by maintaining the inner walls of the heat exchangers and furnace tubes, where such iron sulfides are present, at a temperature not in excess of about 900° F. and not less than about 750° F. and under regenerating conditions including a low oxygen, $O_2$, concentration. The sulfur dioxide then passes through the reforming catalyst without effectively displacing rhenium components from the carrier base. Further, by removal of these sulfides, complete regeneration of the catalyst is facilitated for subsequent redistribution of the platinum component at temperatures in excess of 900° F., particularly when accompanied by halide addition.

17 Claims, 3 Drawing Figures

IN SITU HYDROCARBON CONVERSION CATALYST REGENERATION AND SULFUR DECONTAMINATION OF VESSELS COMMUNICATING WITH CATALYST REACTOR

FIELD OF THE INVENTION

The present invention relates to the regeneration of reforming catalysts comprising metallic components and a halogen component on a porous carrier material. More particularly, it relates to the regeneration of reforming catalysts containing a platinum group component and/or a rhenium component in association with a halogen component on a porous inorganic oxide, such as one containing alumina and/or silica.

The invention has for a particular object a method of regenerating reforming catalysts without significant displacement of the rhenium components by sulfur oxides generated during the regeneration process by a regeneration step particularly directed to oxidation of iron sulfide scale on the surface of heat exchangers and furnace tubes at temperatures and pressures which substantially reduce both formation of sulfur trioxide from sulfur dioxide entering the catalyst bed and resulting absorption of such sulfates on the catalyst particles. The method is particularly characterized in that no modification of the catalytic reforming process flow circuit is required, such as by disconnecting or isolating the heat exchangers and furnace tubes which during normal operation of a catalytic reformer unit convert minute quantities of sulfur in the hydrocarbon feed to iron sulfide. And, coke or carbon removal from the catalyst is carried out in a conventional manner by oxidation at temperatures up to about 750° F–800° F.

In accordance with the present invention, such sulfide scale is converted to sulfur dioxide, $SO_2$, without substantial oxidation to sulfur trioxide, $SO_3$, by maintaining the inner walls of the heat exchangers and furnace tubes, where such iron sulfides are present, at a temperature not in excess of about 900° F. and not less than about 750° F. and under regenerating conditions including a low oxygen, $O_2$, concentration. Preferably, a temperature of about 750° F. to 850° F. is used so that such sulfides are converted to sulfur dioxide, without significant generation of sulfur trioxide. The sulfur dioxide will then pass through the reformer catalyst without effectively stripping rhenium components from the carrier base. Further, by removal of these sulfides, complete regeneration of the catalyst is facilitated for subsequent redistribution of the platinum component at temperatures in excess of 900° F., particularly when accompanied by halide addition. Presence of sulfate, on the base strongly displaces chloride. The presence of such halide component is important in the final regeneration of the catalyst in that it promotes more even redistribution of rhenium-platinum components on the carrier base. However, since such redistribution is preferably carried out at temperatures in excess of 900° F., in accordance with the present invention, regeneration of the catalyst is completed before addition of such halide component to the regeneration gas at such higher temperatures, with or without higher oxygen concentrations. Accordingly, substantially all carbonaceous material on the catalyst particles is removed and the sulfur content of the catalyst is reduced to substantially zero, (preferably less than 0.3 weight percent) before such temperature increase, or the halide component is added.

BACKGROUND OF THE INVENTION

Catalysts used in hydrocarbon conversion processes such as reforming, cracking, isomerization, alkylation, etc., normally become deactivated after a period of catalytic use. It is known to regenerate such catalysts by treating them with an oxygen-containing gas to burn off deactivating substances such as carbon in the form of coke. Regeneration of hydrocarbon conversion catalysts with oxygen has often been performed in situ, i.e., by leaving a bed of catalyst in the reactor in which it had been used for catalytic conversion and passing an oxygen-containing regeneration gas into the reactor and through the catalyst bed to burn the deactivating substances off the catalyst.

Many hydrocarbon conversion systems, particularly naphtha hydroreforming units, employ a process in which the hydrocarbon feed passes in series through two or more separate reactors. Each of the reactors contains at least one bed of a catalyst, and each reactor is connected to one or more other vessels by large-sized conduits through which the feed is passed. When the hydrocarbon conversion reaction, or reactions, being carried out in a particular system are endothermic, as in reforming, a furnace is normally connected into each of the large feed conduits upstream of each reactor to add required heat to the feed.

During in situ regeneration of a catalyst in plural-reactor-vessel conversion units, an oxygen-containing gas is conventionally passed in series flow through all the reactor vessels. The large feed conduits running between the reactors are used to pass the oxygen-containing gas from one reactor vessel to the next. Such flow is also through any heaters or heat exchangers connected in series with the reactors.

Hydrocarbons used as charge stocks for hydrocarbon conversion systems often contain some sulfur compounds. During the on-stream operation of a conversion unit, sulfur in the feed reacts with iron on the surface or in the linings of the conduits, the reactor, furnaces and other vessels, to form iron-sulfide scale. To some extent, sulfur may also be deposited directly in catalyst beds during hydrocarbon processing. In catalytic reforming units, sulfur contamination is usually a problem primarily in the furnaces and heat exchangers employed to heat the feed being charged to the reactors.

When a catalyst is regenerated in situ in a unit which has been contaminated with sulfur, oxygen in the regenerating gas reacts with sulfide scale to form sulfur dioxide. Some hydrocarbon conversion catalysts, e.g., those containing platinum may in turn catalyze the reaction of sulfur dioxide and oxygen in the regeneration gas, at certain temperatures, to form sulfur trioxide. Sulfur trioxide may then react with alumina in the catalyst to form a sulfate, displacing halide and partially displacing catalytic metals such as rhenium and platinum. The presence of the sulfate may then prevent a halide such as a chloride from reacting with the alumina surface and thereby impede redistribution of catalytic metals on the alumina. Since an even redistribution of catalytic metals over the alumina surface is essential for proper catalyst regeneration, the presence of sulfates on the catalyst surface during halide addition is undesirable.

Chemical cleaning of the whole conversion system effectively removes sulfur from all the vessels, and thus prevents substantial sulfate contamination of catalyst beds, but is costly and time-consuming. The present invention provides an economical and easily performed process for reducing formation of contaminant sulfate in the catalyst bed when the reactor containing the bed is connected to other vessels such as furnaces and reactors by large feed conduits. The present process may also prevent sulfur contamination of downstream catalyst beds, and heaters during successive regenerations and on-stream periods following a run in which severe sulfur contamination occurs.

It has previously been suggested, as in U.S. Pat. No. 3,137,646 Capsuto, to isolate various heavily sulfur-contaminated elements of a hydrocarbon conversion unit, such as furnace and heat exchanger tubes, before contacting a deactivated catalyst with an oxygen-containing regeneration gas and to purge iron sulfide from the isolated heat tubes with high-temperature steam and/or an oxygen-containing gas. The freed particles of sulfide scale and/or sulfur dioxide-containing gas are then removed from the system. This type of vessel cleaning requires that several expensive valves or similar apparatus be installed directly into large feed conduits. Such apparatus is expensive and is unnecessary for normal operation of the conversion system and is used solely in the relatively infrequent regeneration of a catalyst. This procedure also requires unusually high-temperature conditions.

Other procedures for eliminating sulfide scale from heaters and other sulfur-contaminatable vessels in hydrocarbon conversion units are deficient in that they fail to provide an effective method of preventing deposition of sulfur, as the sulfate, in a catalyst bed during in situ catalyst regeneration, which results in hindering proper redistribution of catalytic metals on an alumina catalyst base.

U.S. Pat. No. 3,716,477 Jacobson et al, assigned to the assignee of the present invention, is generally directed to a reforming operation for naphtha feed through a catalyst comprising platinum and rhenium supported on a porous inorganic oxide carrier in the manufacture of high octane gasoline. It discloses a regeneration process for maintaining catalyst activity which includes passing a gas containing nitrogen and oxygen through the catalyst bed at a temperature that is from about 750° to 1200° F. by maintaining the oxygen content in an amount less than about one volume percent. The patent does not disclose or discuss the problem of sulfur dioxide or sulfur trioxide contamination of the reforming catalyst.

U.S. Pat. No. 4,155,836 Collins et al, is directed to a reforming system using a catalyst which includes a platinum group metal and a halogen. The regeneration process involves decontamination or regeneration of the catalyst when it has been directly contacted by a high sulfur and water content hydrocarbon feed stock. The process includes discontinuing feeding of the contaminating feedstock and passing hydrogen over the contaminated catalyst. It does not include any process for removing sulfur from the furnace tubes and heat exchangers during regeneration of the catalyst by heating and passing an oxygen containing gas through the furnace tubes and then through the reactor.

U.S. Pat. No. 4,033,898 Jacobson et al, also assigned to the assignee of the present invention, discloses a regeneration system wherein carbonaceous deposits on the catalyst are burned and sulfur is converted to sulfur trioxide which forms sulfates in the catalyst; thereafter the sulfate is removed from the catalyst by hydrogen treatment and the resulting reduced gases are removed.

U.S. Pat. No. 3,773,686 Hayes is directed to a multi-step catalyst regeneration process in which during each step it is essential that the gas employed in the regeneration be free of sulfur compounds, and in particular oxides of sulfur and $H_2S$. The method also contemplates the use of water in the conventional burning steps for catalyst reactivation.

To overcome some of the difficulties attendant upon the deposition of sulfide scale on and in the upper portion of a static bed of platinum-group metal catalyst U.S. Pat. No. 2,884,372 Bergstrom discloses submerging foraminous baskets in the upper portion of the static bed of platinum catalyst.

U.S. Pat. No. 2,792,337 Engel shows that oxygen-containing gas may be introduced into the catalyst bed without prior contact with parts of the reactor and feed inlet line and to pass part of the gas back through the forepart of the catalyst bed and the feed inlet line of the reactor and the remainder forward through the catalyst bed without recycling any part of the gas through the catalyst bed.

U.S. Pat. No. 2,873,176 Hengstebeck discloses that difficulties can be avoided by not exposing the sulfide scale in the heater tubes to free oxygen. Hengstebeck teaches to pass inert carrier gas through the heater and to inject sufficient oxygen to produce combustion of the carbonaceous material, usually designated as coke, into the carrier gas between the heater and the reactor.

U.S. Pat. No. 2,923,679 Thomson teaches that the heated oxygen-containing regeneration gases flow through the reforming unit in a direction which is the reverse of the flow of naphtha and hydrogen-containing gas.

As contrasted to other systems, the present invention does not depend upon diverting, through additional expensive valves and auxiliary conduits, the sulfur-containing gases resulting from regenerating the catalyst and auxiliary equipment. For desulfurizing both auxiliary equipment and catalyst during regeneration of the catalyst, this invention is directed to an improved regeneration method requiring only control of the temperatures and flow of oxygen-containing gas through the reforming unit, including furnaces, connecting conduits and catalyst-containing reactors, first to remove carbon components from the catalyst and then to remove sulfur contaminants from the reactor system.

SUMMARY OF THE INVENTION

In a preferred embodiment, the present invention relates to improvements in a process for regenerating in situ catalyst contaminated with carbonaceous deposits in a catalytic hydrocarbon conversion unit. Such a unit includes a reactor vessel containing a bed of catalyst comprising a Group VIII metal on an alumina carrier and sulfur-contaminated vessels and conduits, such as heat exchanger or furnace tubes communicating with said reactor by a conduit. The improvement comprises, first, passing an oxygen-containing gas through the sulfur-contaminated vessels and conduits and a bed of catalyst in the reactor at a temperature up to about 750° F. until the oxidation is substantially finished, as indicated by the $O_2$ content of the effluent gas becoming substantially equal to the $O_2$ content of the inlet gas. Then, the temperature of said gas is increased to the range of 750°–900° F., preferably 750°–850° F. whereby sulfur components in the contaminated vessels and/or conduits and in the catalyst are converted to sulfur dioxide with minimum conversion to sulfur trioxide. In this way such sulfur compounds do not tend to react with the catalyst. The resulting sulfur compounds in the gas exiting said reactor are then removed. This step is continued until such sulfur components of the effluent gas are suitably reduced, preferably to substantially zero. In a preferred method of carrying out the process, the oxygen-containing gas at the beginning of the burn contains no more than about 1% oxygen. Desirably, the oxygen-containing gas is also saturated with water. Further, after the carbon and sulfur contents of the effluent gases are so reduced, such regenerating gas temperature is then raised to 900° F. or above and a small amount of a halide is added to assist in redistribution of at least the platinum component on the base. In a still further preferred embodiment, the regenerating gases exiting from the reactor are treated to remove substantially all the sulfur contaminants and the resulting sulfur-free gases are recycled to the vessels, conduits and catalyst bed until the effluent gas is substantially sulfur-free.

The method is particularly characterized in that first only sufficient oxygen-containing regenerating gas is supplied at a rate, and at temperatures and concentration to hold conversion of the coke on the catalyst to carbon monoxide and carbon dioxide without significant concommitant conversion of iron sulfides on the surfaces of the vessels, furnaces, heat exchangers or conduits to sulfur dioxide or sulfur trioxide. Thus, such sulfur oxides are not available to deposit on the catalyst with consequent removal or displacement of significant amounts of the platinum group and rhenium group components therefrom. The temperature of such regenerating gas is then raised to oxidize metal sulfide deposits in the system and to remove effectively such sulfur as sulfur dioxide in the effluent stream passing through the catalyst. The platinum and rhenium components are thereby left in place on the catalyst base so that these components may be readily distributed by addition of a halide component at a suitable elevated temperature.

Further objects and advantages of the present invention will become apparent from the following detailed description taken in conjunction with the accompanying drawings which form an integral part of the present specification.

Only those elements of a catalytic reforming unit necessary for an understanding of an embodiment of the invention are depicted in the drawing. Other elements included in catalytic reforming units are not shown or described, e.g., compressors, pumps, additional heat exchangers, etc., since their placement and operation in a reforming system, will be readily understood by those skilled in the art.

DETAILED DESCRIPTION OF THE INVENTION

Method Embodiments

The present process may appropriately be applied to catalysts having a alumina component and a Group VIII metal component. Alumina either alone or mixed with one or more other refractory inorganic oxides, is often used as a carrier for catalytic metals or metal compounds, particularly the Group VIII metals. The Group VIII metals used include especially platinum, palladium, iridium, and compounds and mixtures thereof. Platinum, for example, is commonly used in hydrocarbon conversion catalysts, either alone or combined with other Group VIII metal such as palladium or iridium, or with such promoter metals as rhenium, tin, germanium, lead, etc. Catalysts containing two or more Group VIII metals and/or other metals, such as rhenium, tin, or the like, are suitable for regeneration by the present process. Catalysts including a Group VIII metal and/or a promoter and alumina are often used in such hydrocarbon conversion processes as reforming, paraffin isomerization, alkyl aromatic isomerization, hydrogenation, dehydrogenation, alkylation and cracking. The present process may be used in hydrocarbon conversion systems for carrying out these or other like processes. Many catalysts which contain a Group VIII metal and alumina also include a halogen component, such as chlorine or fluorine or both. The addition of a halogen component is particularly common in the case of catalysts used in reforming and isomerization. The present process may suitably be employed to regenerate catalysts having a halogen component, preferably a chloride component. Further, the present invention is most particularly applicable to hydrocarbon conversion systems such as catalytic reforming systems, isomerization process systems, etc., in which the processing system includes at least one reactor containing one or more beds of one or more hydrocarbon conversion catalysts, and wherein the catalyst bed to be treated is regenerated in situ in the reactor after the catalyst has become deactivated through use.

A given reactor normally communicates with other vessels such as furnaces, heat exchangers, other reactor vessels, etc., by way of conduits. Such associated vessels are normally located both upstream and downstream of a particular reactor in a processing system. For example, in a catalytic reforming unit, wherein the reaction is endothermic, an associated furnace is normally located upstream of each reactor and communicates with the reactor by a large conduit through which heated feed is passed to the reactor. In systems with plural reactors in series, for every reactor except the last, another furnace and another reactor are associated with the given reactor at its downstream end by a conduit running between the first reactor and the furnace and between the furnace and the second reactor. Normally part of the gaseous portion of the effluent reaction product is recycled from the last reactor in the series to one of the earlier reactors; generally, the first.

Catalyst beds in hydrocarbon conversion systems can be detrimentally affected by the presence of sulfur in the system. Sulfur is commonly carried into the processing system in the hydrocarbon feedstock, where it is usually present in minor amounts, except during upsets, when large amounts of sulfur may be introduced. Sulfur contamination of such systems generally results in formation of metal sulfides, particularly from reaction of hydrogen sulfide with rust or scale in such conduits, furnaces, heat exchangers, reactor walls and "internals", and the like, through which the heated feed flows prior to entry into the catalyst bed. Such sulfur compounds create serious problems during in situ regeneration of a catalyst which has become deactivated by use in converting such a hydrocarbon feedstock.

The present process is carried out in connection with oxidative, in situ regeneration of hydrocarbon conversion catalysts and without feed circuit modification. Thus, it is contemplated that normal shutdown and volatile-hydrocarbon purging procedures will have been undertaken prior to carrying out the process of the invention. Accordingly, the hydrocarbon conversion system in which the present process is to be used will be free of hydrocarbon vapors and liquids and will have been purged of volatile, flammable materials by conventional purging of the whole system with an inert gas. Normally, a particular conversion system is isolated from the other systems in a refinery during regeneration by inserting plates into flanges built into the conduits connecting the system to other refinery equipment. This is done before the system to be regenerated is purged of the hydrocarbon vapors.

The first step in carrying out the present process is contacting the feed system, including the conduits, and heat exchanger, and furnace tubes, as well as the catalyst bed which is to be freed from coke, with an oxygen-containing gas. The amount of oxygen in the gas may be between about 0.1 and about 2.0 volume percent and is preferably between about 0.3 and 0.8 volume percent. The remainder of the gas is made up of one or more gases which are inert in the particular conversion system, such as nitrogen, argon, steam or carbon dioxide. A mixture of nitrogen and sufficient air to supply the required amount of oxygen is a preferred oxygen-containing gas for use in the present process. The oxygen-containing gases are then first passed through the heat exchanger and furnace tubes and then through the bed of hydrocarbon conversion catalyst in any convenient manner while being maintained at a temperature of not more than about 750° to 800° F. to burn off carbon, or "decoke", the catalyst. Such low temperature decoking of the catalyst is highly desirable to avoid potential "hot spots" in the catalyst bed. Hot spots, or excessive local temperatures, can result in serious damage to the catalyst particles including removal of the active components from the base. Such regeneration to remove coke is continued until the carbon content of the catalyst is substantially zero, that is, less than about 0.1 weight percent. However, after such carbon removal it has been common practice to immediately raise the temperature of the gas to at least 900° F. to redistribute the platinum component on the catalyst. Such elevated temperature is generally accompanied by addition of a halide component. Such immediate raising of the temperature was done without regard to sulfur content in the conversion system.

As particularly distinguished from such prior practice, after the carbon content of the catalyst is suitably reduced, the present invention includes a desulfurizing step for regeneration of the system. For this purpose, the temperature of the oxygen-containing gas is raised to a temperature of between about 750° F. and 900° F., preferably between about 750° F. and 850° F. Such preferred temperature is the temperature of the iron sulfide, as measured at the inside wall of the conduit, furnace, or heat exchanger. The gas is maintained at a pressure of from about atmospheric to about 40 atmospheres. The length of time for which the pipes, tubes and catalyst are contacted with the gas is that required to convert substantially all of the sulfur in iron or other metal sulfides on the heat exchangers, furnace tubes and feed conduits to $SO_2$.

The oxygen-containing gas, for both the carbon and sulfur removal steps, is preferably contacted with the tubes or pipes and the catalyst bed by a known procedure for circulating an oxygen-containing gas through such a system to burn deactivating materials off the catalyst. The contacting is preferably accomplished by continuously passing a stream of the oxygen-containing gas throughout the internals of the hydrocarbon conversion system, including the reactor containing the catalyst bed. Circulation of such gas is first regulated to initiate and carry out the burn at a temperature of the catalyst bed of up to about 750° F. to remove carbon and then raised to a temperature below 900° F., and preferably below 850° F., but above about 750° F. Flow is continued so long as a sulfur component is detectable in significant quantity in the effluent gas. Decrease in carbon in the first step may be evidenced, for example, by the presence of only a small temperature difference between reactor inlets and outlets. During treatment of the system with oxygen-containing gas, some carbon dioxide, carbon monoxide and water vapor are generated and are commingled with the inert gases and oxygen in the gas in the system. As the tubes, pipes and catalyst are treated with the oxygen-containing gas, the resulting gas mixture is removed from the reactor and recovered or disposed of, as required by environmental conditions. Removal of substantially all sulfur in the second step may be determined by sampling the effluent gas for sulfur dioxide.

After regeneration, the treating gas is purged from the hydrocarbon conversion system, preferably by purging the reactor and the system in a conventional manner with an inert gas.

Treating with system with oxygen-containing gas at carefully regulated temperatures as described above converts sulfur in the heat exchangers or furnace tubes to sulfur dioxide without significant conversion to sulfur trioxide so that such sulfur trioxide is not available to interact with alumina in the catalyst thereby to form a sulfate which remains in the catalyst bed. Hence, sulfate materials that would interfere with further regeneration of the catalyst are not present. This is particularly important with a catalyst which contains a halogen component and a promoter metal such as rhenium, in addition to the Group VIII metal and alumina. Accordingly, special precautions to handle sulfur trioxides in the catalyst bed are not required, such as by costly special valves for external diversion of effluent from the catalyst bed. Further, since little of such sulfur trioxide is formed, obviously it need not be removed from the catalyst by subsequent hydrogen treatment.

Apparatus Embodiments

Figure 1:
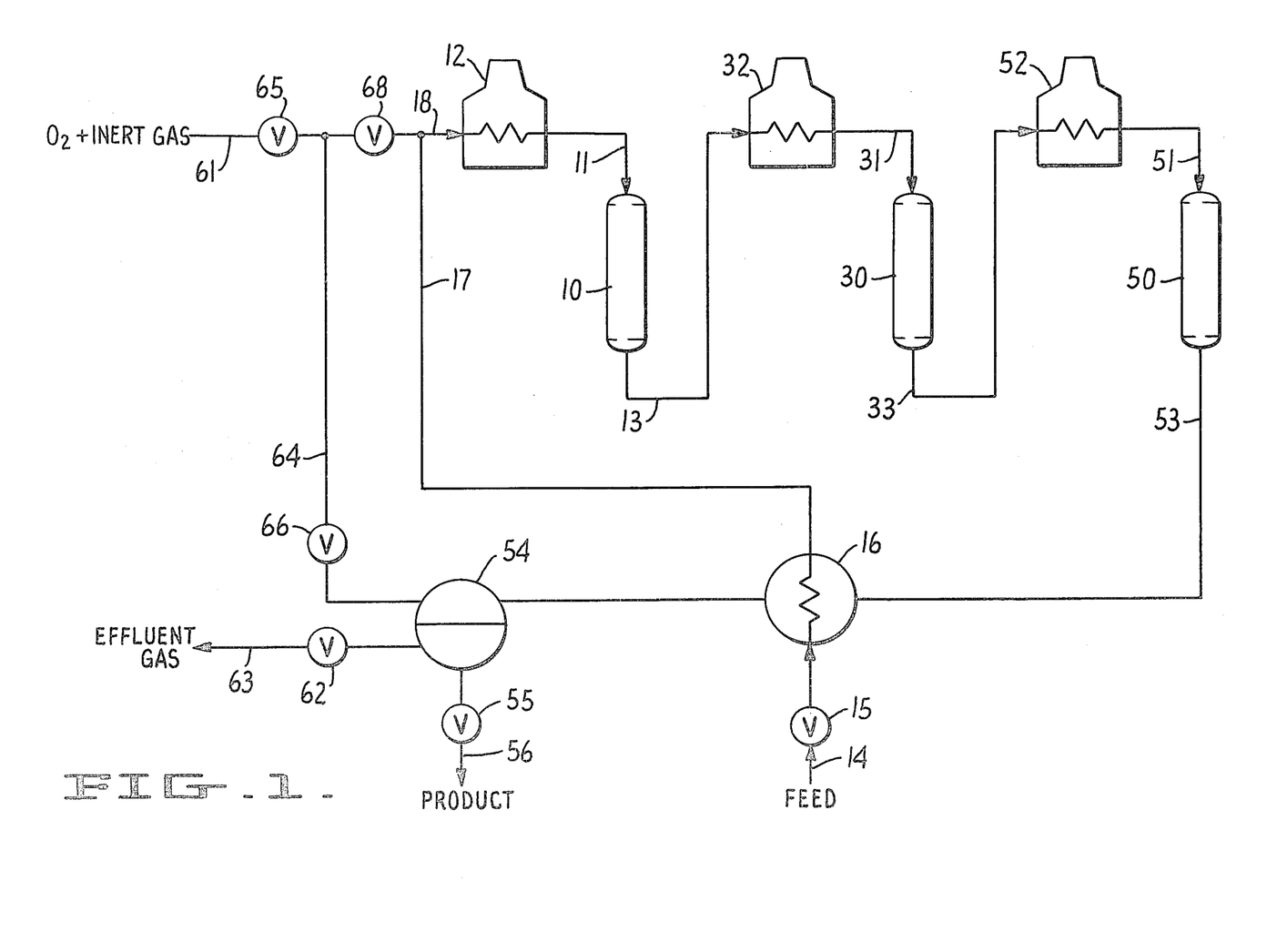
FIG. 1 is a schematic representation of a catalytic hydrocarbon reforming conversion system having a plurality of reactor vessels with furnaces and heat exchangers in series with each other through flow conduits; the components of such a system are subject to the type of carbon and sulfur contamination to which the regeneration method of the present invention may be applied.

Referring now to the drawings, and in particular to FIG. 1, there is shown a catalytic reforming system suitable for practice of the present invention. It includes a plurality of reforming reactors, vessels 10, 30 and 50. Each reactor contains a bed of commercially available reforming catalyst. The particles of such a catalyst bed desirably include a platinum component, a rhenium component and a chloride component composited with a base of alumina.

Prior to starting the present process, the catalyst beds in the system have become deactivated by catalytic use, as in reforming a naphtha feedstock, and the reforming system has become sulfur contaminated by contact with sulfur brought into the system in the feed. The system has been shut down and volatile materials have been purged from it in a conventional manner. In shutting down the unit, the feed inlet conduit 14 and the product outlet conduit 56 have been blocked off as by closing valves 15 and 55, respectively, to separate the reforming system from other refinery equipment. Further, nitrogen-containing gas has been passed through the system, as by line 61, at an elevated temperature and removed from the system, as by line 63 in order to purge volatiles from the system.

After volatiles have been purged, an oxygen-containing gas is passed into the system by way of valves 65 and 68 and conduit 61. The path of the oxygen-containing gas is then through the conduit 18, furnace 12 and conduit 11 into first reactor 10. After passing through the catalyst bed in reactor 10, the resulting gas is withdrawn through conduit 13. Gas then flows through conduit 13, second reactor furnace 32 and conduit 31 into the second, or intermeidate reactor 30. Gas from such intermediate reactor 30 then flows through conduit 33 to third reactor or tail furnace 52 and then by conduit 51 to third reactor 50. The gas finally flows through line 53 to pass through the shell side of an effluent heat exchanger 16 and then to high pressure gas separator 54. The tube side of the heat exchanger is connected to inlet feed line 14 through valve 15. Effluent gas is removed through line 63 under control of valve 62. Recycle of gas from separator 54, either during normal reforming operation or regeneration is through line 64, controlled by valves 66 and 68.

In performing the method of the present invention, special valves and conduits, primarily useful only during regeneration of catalyst in reactors 10, 30 and 50, are not required to bypass or short circuit any of the continuous circuit, as above described. Coke is removed exclusively by circulation of the oxygen-containing gas through such circuit at the prescribed temperatures and concentrations. However, as discussed above, the problem of disposing of sulfur in such a circuit originates primarily in such reactor elements as furnace 12, and conduit 11. This is due to conversion of iron oxides on the surface of the steel tubing and conduits of these elements to iron sulfide during normal heating and flow of the feed stock for catalytic conversion in the reforming system. Thus, upon increasing temperature and addition of oxygen to this portion of the system during catalyst regeneration, iron sulfide is oxidized to iron oxide and sulfur dioxide is generated in sufficient quantities to have a deleterious effect on the platinum-rhenium catalyst in at least reactor 10, if the temperature is sufficient to form significant amounts of sulfur trioxide in the catalyst bed.

Accordingly, the temperature of the reforming system is first raised up to about 750° F. to burn coke, primarily carbon, from the catalyst particles in reactor 10, 30 and 50 by controlling the rate and concentration of oxygen in the gas entering through line 61. Such circulation of oxygen-containing gas is continued until the effluent gas leaving through line 63 is essentially carbon-free. After such carbon removal step, sulfur is removed by raising the temperature of the oxygen-containing gas to a range of from 750° F. to 900° F., preferably about 750° F. to 850° F., as measured on the surface of the inner walls of the tubes in furnace 12 or conduit 11. The oxygen content of the gas flowing into the system may be regulated by valves 65 and 68. Desulfurization of the reformer flow circuit is then continued until the sulfur content of the catalyst is satisfactorily low. When so controlled, sulfur conversion to sulfur trioxide is held to a minimum and deposition thereof on catalyst in reactors 10, 30 or 50 largely avoided.

Upon completion of the sulfur purge, the temperature of the system including each of the reactors 10, 30 and 50 may be raised to assist in redistribution of the platinum components. Accordingly, the temperature is then raised to the 900°-1050° F. range for the final regeneration steps, including any chloride addition to assist such platinum redistribution.

Upon completion of regeneration of catalyst including desulfurization of the feed tubes and conduits, the reforming system may be returned to normal operation by closing valves 65 and 62 and opening both feed valve 14 and product outlet valve 55.

Desirably, but not necessarily, the oxygen-containing egenerating gas is recirculated during carbon and/or sulfur components removal. For this purpose line 64 supplies recycle gas to the the regeneration system from separator 54 through valve 66. As shown, flow of recycled gas to furnace 12 through valve 68 may be continued without further addition of oxygen-containing gas.

Figure 2:
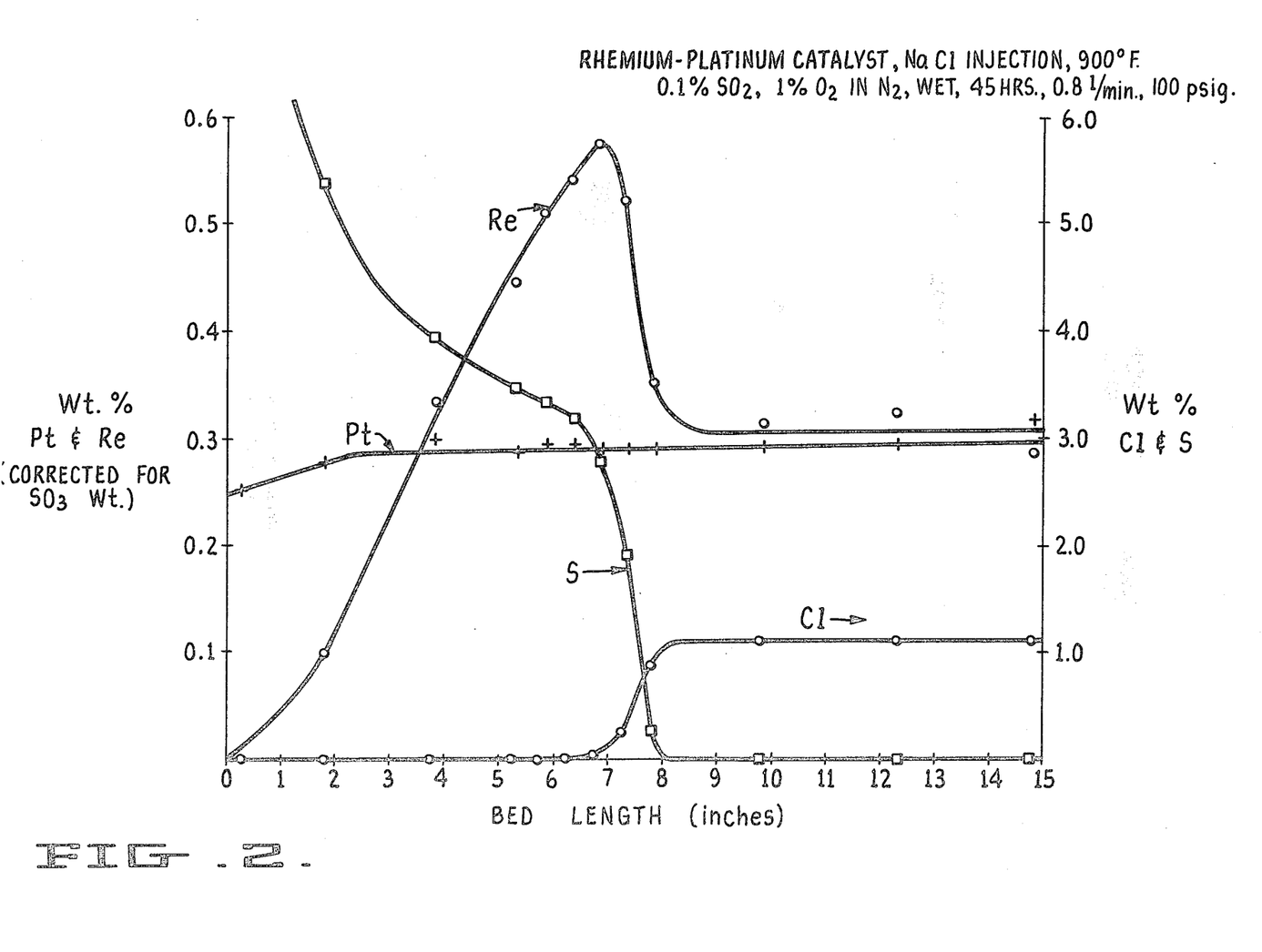
FIG. 2 is a graph of the stripping effect of sulfur oxides on rhenium and chloride components of a reforming catalyst during regeneration of a catalyst bed at normal elevated oxygen concentrations and temperatures of the oxygen-containing regenerating gas.
Figure 3:
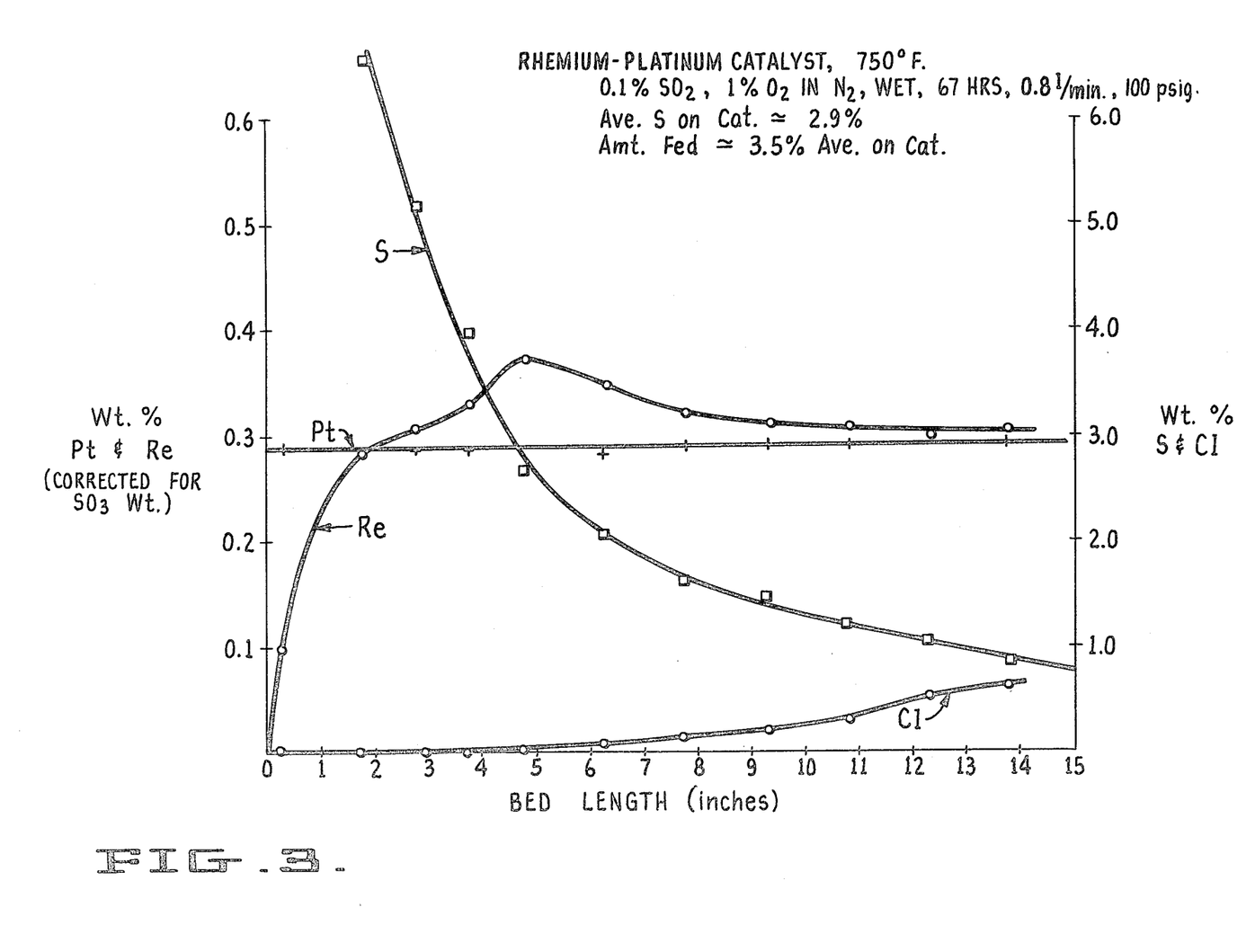
FIG. 3 is a graph of the effect of sulfur oxides on reforming catalyst components in a catalyst bed when applied in proper sequence and at temperatures in accordance with the present invention.

FIGS. 2 and 3 present in graphic form the particular virtues of the present invention in regenerating a catalytic reforming system of the type described herein. These graphs represent experimental regeneration runs through catalyst samples in which commercial catalyst having a platinum component, a rhenium component and a chloride component were present on an alumina base.

FIG. 2 shows the effect of regenerating such catalyst in accordance with the prior art where sulfur is present in the form of a sulfur oxide in the gas traversing the catalyst bed under high temperature conditions. A bed length of 15 inches is shown as the abscissa of the graph. The weight percentage of platinum and rhenium are the left hand ordinates and that of chloride and sulfur ions are the right hand ordinates. As indicated, addition of the sulfur component in the form of $SO_2$ in the presence of excess $O_2$ at the given conditions effectively displaces a large percentage of the rhenium component from the catalyst to the right, leaving the catalyst on the left-hand portion of the bed greatly depleted of this component. The peak on the rhenium curve indicates the greatly increased concentration just ahead of the sulfur component in the bed, thereby indicating the deleterious effect of the sulfur trioxide at such high temperature. Similarly the sulfate displaces virtually all chloride component from the same portion of the bed.

FIG. 3 indicates the unobvious improvement in regeneration of catalyst in a similar bed according to the present invention. The graph coordinates are the same as those defined for FIG. 2. As shown in FIG. 3, at the lower operating temperatures of the present invention, only a relatively small percent of rhenium is displaced from the inlet portion of the catalyst bed. At these lower temperatures as shown in FIG. 3, an appreciable reduction in rhenium displacement is obtained as compared to the higher temperature of FIG. 2.

Operative Example

The following example shows the effectiveness of the sulfur removal step of the present invention under the temperature and oxidative conditions specified. To simulate the condition of iron sulfide on the surface of a steel vessel or conduit, 0.2 grams of iron sulfide was placed above 1.0 gram of sulfided steel chips from a commercial reformer reactor. The sample was then heated in air saturated with water at 75° F. flowing over the sample. The following results were obtained:

| Temp. °F. | Elapsed Time- (Minutes) at Temp. | Evolved $SO_2$ ppm |
|---|---|---|
| 750° | 15 | <10 |
| 800° | 10 | 2-3 |
| 800° | 45 | 10 |
| 750° | 40 | <2 |

As indicated, appreciable $SO_2$ evolution starts to occur in the range 750° F. to 800° F.

While only a few embodiments of the present invention have been described, various modifications or changes can be made in the procedural steps as applied to known processes without departing from the spirit or scope of the present invention. All such modifications or changes coming within the terms of the claims are intended to be included therein.

We claim:

1. In a process of regenerating in situ a fixed bed of platinum- and rhenium-containing alumina-base reforming catalyst containing carbonaceous deposits in a reforming system including sulfur-contaminated vessels and/or conduits in flow communication with said fixed catalyst bed, the improvement which comprises using the reforming flow path without change through said vessels and/or conduits and fixed catalyst bed, passing an oxygen-containing gas through said sulfur-contaminated vessels and/or conduits and the bed of catalyst in the reactor at a temperature of not more than 750° F. whereby said carbonaceous deposits are burned off of said catalyst, then after substantially all of the carbonaceous deposits are removed, increasing the temperature of said oxygen-containing gas to a range of 750°-900° F. to oxidize the sulfur in said contaminated vessels and/or conduits and/or said catalyst to sulfur dioxide to permit removal therefrom with minimum conversion to sulfur trioxide which tends to react with the catalyst, and after substantially all the sulfur contaminants are removed, continuing the flow of oxygen-containing gas with the temperature increased to above about 900° F. to redisperse the platinum on the surface of the alumina base without substantial displacement of the rhenium from the alumina base.

2. The process of claim 1 wherein the amount of oxygen in said oxygen-containing gas is limited so that the temperature in said sulfur removal step is maintained in the range of 750°-850° F.

3. The process of claim 1 wherein said oxygen-containing gas initially, at the beginning of said burn, contains no more than 1% oxygen.

4. The process of claim 1 wherein said oxygen-containing gas is saturated with water at temperatures of from 32° F. to 212° F.

5. The process of claim 1 wherein after said sulfur content of said vessels and/or conduits in communication with said catalyst is reduced, said regenerating gas temperature is then raised to a range of 900° to 950° F. and a halide component is added to the circulated gas.

6. The process of claim 1 wherein the effluent gases exiting from said reactor are treated to remove substantially all sulfur contaminants therein and the resulting sulfur-free effluent gases are recycled through said vessels and/or conduits and said catalyst bed.

7. The process of claim 1 wherein after the sulfur removal step said regenerating gas temperature is raised to a range of 900° to 950° F. and a chloride component is added to the circulated gas.

8. The process of claim 1 wherein the effluent gases from said reactor are treated to remove substantially all of said sulfur contaminants therein and the resulting sulfur-free effluent gases are recycled to said bed during said catalyst regeneration.

9. The process of claim 1 wherein the carbon content of said catalyst in said bed has been reduced to less than about 0.1 weight percent before the temperature is increased to a range of 750°-900° F.

10. In an in situ catalyst regeneration system wherein regeneration gases are circulated through at least one fixed bed of an alumina-base catalyst including a platinum component, a rhenium component and a halide component in a reactor vessel interconnected in series with a sulfur-contaminated conduit in a reforming system to remove carbonaceous deposits thereon with the temperature of said gas being maintained at up to about 750° F. and wherein additional halide is circulated through said catalyst bed in a circulating gas at a temperature above 900° F. after the carbon content of the said catalyst has been reduced to facilitate redispersion of said platinum component over the alumina surface of said catalyst, the improvement comprising maintaining the temperature at not more than 750° F. until substantially all of the carbonaceous deposits are removed, continuing the flow of said oxygen-containing gas through the reforming flow path including said catalyst bed and sulfur-contaminated conduit at an increased temperature of from about 750° F. to 900° F. at the inner surface of said conduit until substantially all of the sulfur contamination is removed with minimum conversion to sulfur trioxide to prevent sulfur contamination of said catalyst prior to said halide addition step whereby redispersion of said platinum component over the alumina surface of said catalyst occurs without substantial displacement of the rhenium from the alumina base.

11. The process of claim 10 wherein the amount of oxygen in said oxygen-containing gas is limited so that the temperature in said sulfur removal step is maintained in the range of 800°-850° F.

12. The process of claim 10 wherein said oxygen-containing gas contains no more than 1% oxygen at the beginning of the carbon removal step at ambient temperature.

13. The process of claim 10 wherein said oxygen-containing gas is saturated with water at temperatures of from about 32° F. to 212° F.

14. The process of claim 10 wherein the effluent gases exiting from said reactor are treated to remove substantially all of the sulfur contaminants therein and the resulting sulfur-free effluent gases are recycled through said bed.

15. In an in situ catalyst regeneration system wherein an oxygen-containing gas is (a) first circulated through at least one fixed bed of an alumina-base catalyst including a platinum component, a rhenium component and a halide component to remove carbonaceous deposits thereon at a temperature of up tp 750° F. and said catalyst bed is in a reactor vessel interconnected in series with a sulfur-contaminated conduit and/or another reactor vessel in a reforming system, and then (b) the temperature of said circulating gas is increased to above about 900° F. and additional halide is circulated together therewith through said catalyst bed, the method of preventing substantial removal of at least said rhenium component from catalyst in said bed during regeneration which comprises using the reforming flow path without change through said vessels and/or conduits and fixed catalyst bed, maintaining the temperature in step (a) at not more than 750° F. until substantially all of the carbonaceous deposits are removed, and before circulation of said additional halide through said catalyst bed to redistribute said platinum component on said catalyst in step (b), sulfur is removed from said sulfur contaminated portions of said conduit, said catalyst bed and/or said reactor vessels by increasing the temperature of said circulating oxygen-containing gas to a temperature of from about 750° F. to 900° F. and continuing said circulation to convert said sulfur to sulfur dioxide with minimum conversion to sulfur trioxide until substantially all the sulfur contaminants are removed, whereby said rhenium component on said catalyst is not displaced during said redistribution of said platinum component in step (b).

16. The process of claim 15 wherein the effluent gases exiting from said reactor are treated to remove said sulfur contaminants therein and the resulting sulfure-free effluent gases are recycled through said conduit, said vessel, and said catalyst bed.

17. In an in situ catalyst regeneration system wherein regeneration gases are circulated through at least one fixed bed of an alumina-base catalyst including a platinum component, a rhenium compnent and a halide component in a reactor vessel interconnected in series with sulfur-contaminated conduits, and/or vessels, including the vessel containing said catalyst bed, in a reforming system and wherein conventional regeneration through the reforming flow path includes the steps of (a) circulating an oxygen-containing gas through said catalyst bed to remove carbonaceous deposits from said catalyst with the temperature of the effluent gases from said catalyst bed being up to about 750° F., and (b) increasing the temperature of said oxygen-containing circulating gas to above about 900° F. to facilitate redispersion of said platinum component over the alumina surface, the improvement which comprises after step (a) has been continued until the carbonaceous deposits are substantially removed and before step (b) continuing the flow of said oxygen-containing gas through said catalyst bed and said sulfur-contaminated conduits and/or vessels at a temperature of from about 750° F. to 900° F. at the inner surface of said conduits and/or vessels and until the sulfur content of said catalyst is less than about 0.3 weight percent with minimum conversion to sulfur trioxide whereby step (b) is then completed without substantial displacement of the rhenium component from the alumina base.

* * * * *

UNITED STATES PATENT AND TRADEMARK OFFICE
CERTIFICATE OF CORRECTION

PATENT NO. : 4,482,637

DATED : November 13, 1984

INVENTOR(S) : Walden C. BUSS et al

It is certified that error appears in the above-identified patent and that said Letters Patent is hereby corrected as shown below:

In the drawings, Sheet 2, Fig. 2, in the caption at the top, "RHEMIUM" should read -- RHENIUM -- and "Na" should read -- No --. Column 8, line 44, "Treating with" should read -- Treating the --. Column 9, line 28, "intermeidate" should read -- intermediate --.

Claim 10, line 40, "bed and sulfur-contaminated" should read -- bed and said sulfur-contaminated --. Claim 15, line 7, "tp" should read -- to --. Claim 16, line 3, "sulfure-" should read -- sulfur- --. Claim 17, line 4, "compnent" should read -- component --.

Signed and Sealed this

Fifth Day of November 1985

[SEAL]

Attest:

DONALD J. QUIGG

Attesting Officer

Commissioner of Patents and Trademarks